United States Patent [19]
Fiddler

[11] 3,752,032
[45] Aug. 14, 1973

[54] SELF ATTACHING COUPLING

[76] Inventor: Theodore E. Fiddler, 1268 Suffield Dr., Birmingham, Mich. 48009

[22] Filed: July 8, 1971

[21] Appl. No.: 160,630

Related U.S. Application Data

[63] Continuation of Ser. No. 21,025, March 19, 1970, abandoned.

[52] U.S. Cl. .................................................. 85/80
[51] Int. Cl. ............................................. F16b 37/04
[58] Field of Search .................. 85/80, 5; 151/41.75

[56] References Cited
UNITED STATES PATENTS

| | | | |
|---|---|---|---|
| 2,975,814 | 3/1961 | Tinnerman | 85/80 |
| 3,358,551 | 12/1967 | Seckerson | 85/80 |
| 3,492,910 | 2/1970 | Van Niel | 85/81 |
| 3,508,593 | 4/1970 | Gill | 151/41.75 |
| 3,574,899 | 4/1971 | Fisher | 85/80 |

FOREIGN PATENTS OR APPLICATIONS 556,544 10/1943 Great Britain .................. 151/41.75

*Primary Examiner*—Edward C. Allen
*Attorney*—William T. Sevald

[57] ABSTRACT

A coupling for mounting a screw in a hole in a wall with the coupling having paired jaws connected to a nut body by spring arms. The coupling is insertable in a hole with the nut body leading and the spring arms next following and engaging the edge of the wall at the hole to tortionally load the spring arms. Upon the spring arms by-passing the hole, the jaws enter the hole. Upon the jaws occupying the hole, the spring arms urge the jaws outwardly to engage both faces of the wall and the edges of the wall at the hole. The jaws have cam bosses at one face of the wall and shoulders at the other face of the wall. The cam bosses and the shoulders oppose one another to grip the wall therebetween. A web extends outwardly from the shoulders and connects to screw engaging pads spaced from the wall. A spring strip triangulates between the shoulders and the pads. Thus the pads and the nut body are spaced from the wall on opposite sides. A screw lies between the nut body and the pads and is free of contact in the hole so that the screw and the coupling are bridge-spanned on each other through the hole. The screw may be assembled fully or partially with the coupling prior to insertion in the hole and the assembly inserted in the hole. Also, the coupling may be put in the hole first and the screw then turned into the coupling.

7 Claims, 12 Drawing Figures

Patented Aug. 14, 1973

INVENTOR.
Theodore E. Fiddler

BY
*William P. Sevald*
Attorney

Patented Aug. 14, 1973

INVENTOR.
Theodore E. Fiddler

BY
Attorney

SELF ATTACHING COUPLING

This invention pertains to a coupling for supporting an adjusting screw and which is insertable in a hole in a wall with the screw fully assembled in pre-set or calibrated condition ready for use and this application is a continuation of my co-pending application Ser. No. 21,025 filed Mar. 19, 1970 and now abandoned.

Adjusting screws are used to locate a part in a desired position by varying the axial projection of the screw. In alining automobile head lamps for example, a plurality of adjusting screws control the angle of the lamp and by turning the screws in and out as indicated, the light beam is properly directed. While the coupling is also suitable to mount screws other than adjusting screws, the adjusting screw is considered a good example to explain the coupling.

Since the adjusting screw must be able to extend and retract, the screw cannot be engaged by forced abutment with the supporting wall. In spite of this, the screw must be supported axially and radially very solidly as slight variation in the support of the screw can cause movement of the screw resulting, for example, in wide variation in the direction of the light beam.

With the foregoing in view, it is an object of the invention to provide a coupling with a radially angular portion for engaging an abutting angular portion on the supporting wall at the hole to hold the coupling against angular movement when the adjusting screw is turned and including locking characteristics to hold the screw against other than forced adjustment turning.

An object of the invention is to provide a coupling which grips the opposite surface faces of the wall at the hole and the edge of the wall defining the hole to firmly and fixedly support the coupling on the wall in the hole to eliminate relative axial movement, radial movement, and combined axial and radial movement, such as a wobbling, so that the coupling itself is accurately held and supported.

An object of the invention is to provide screw engaging and supporting means on the coupling spaced outwardly of the wall surface faces on both sides of the wall to provide the coupling with mechanical advantage to hold the screw against wobbling relative to the coupling.

An object of the invention is to provide a coupling for holding an adjusting screw wherein the compressive force of the screw threads are not exerted against the wall to either hold the coupling at the hole or the screw in the coupling thereby eliminating the inherent indeterminate variances incident in compressive forces so that accuracy is not affected by turning the screw in either direction and so that the device is immediately accurately responsive to turning adjustment.

An object of the invention is to bridge-span the screw on the opposite ends of the coupling to provide axially wide-spaced mechanically advantageous support points away from the wall to hold the screw accurately axially and radially singly and in combination and to space the screw from the coupling in the hole to free the screw and coupling from thread compressive forces at the hole.

An object of the invention is to bridge-span the coupling on the screw adjacent the opposite ends of the screw to provide axially wide-spaced mechanically advantageous support points triangulated axially and radially of the hole in the wall to hold the coupling accurately axially and radially singly and in combination and to space the screw and coupling apart in the hole to free the coupling from screw thread compressive forces at the hole.

An object of the invention is to flexibly bridge-span the coupling and the screw on each other at the outer ends of each with their intermediate portions spaced apart so that the coupling may be flexibly forced radially inwardly to provide clearance for inserting the coupling and screw fully assembled into a hole and so that after insertion the coupling grips the wall at the hole in full mounted and secured condition and, if desired, in pre-set or calibrated adjustment.

An object of the invention is to provide a coupling having paired jaws connected by spring arms to a nut body so that upon insertion in a hole in a wall, the spring arms urge the jaws outwardly in wall gripping engagement.

An object of the invention is to provide a radially inclining cam surface on each jaw to forceably engage one face of a wall at the hole.

An object of the invention is to provide a rockable and resilient triangulated head on each jaw to forceably engage the other face of a wall in axial opposition to each cam surface.

An object of the invention is to provide a web on each jaw lying in the hole and interconnecting the head and the cam surface on each jaw in opposition to each other against opposite wall faces with the action of both pulling the other axially into tighter grip against the wall.

An object of the invention is to use the screw to radially support the head and the cam surface of each jaw at a point axially outwardly of the hole so that the head on one jaw is opposed radially against the head on the other jaw via the screw to hold the screw and to rock the heads back against the wall and also so that the cam surface on one jaw is radially opposed against the cam surface on the other jaw and urged into engagement with the wall.

An object of the invention is to provide a head on each jaw which is deformable under force to provide variable spaced gripping distance between the heads and the cam surfaces so that the coupling is self-adjustable to grip walls of various thickness.

An object of the invention is to provide a triangulating resilient spring strip or bow on each head leading between the screw engaging pad and the wall engaging shoulder of the head which firmly holds the wall engaging shoulder against the wall to adjust for different thickness in walls and which firmly holds the pad against the screw in each paired jaw.

These and other objects of the invention will become apparent by reference to the following description of a coupling embodying the invention taken in connection with the accompanying drawings in which.

Figure 12:
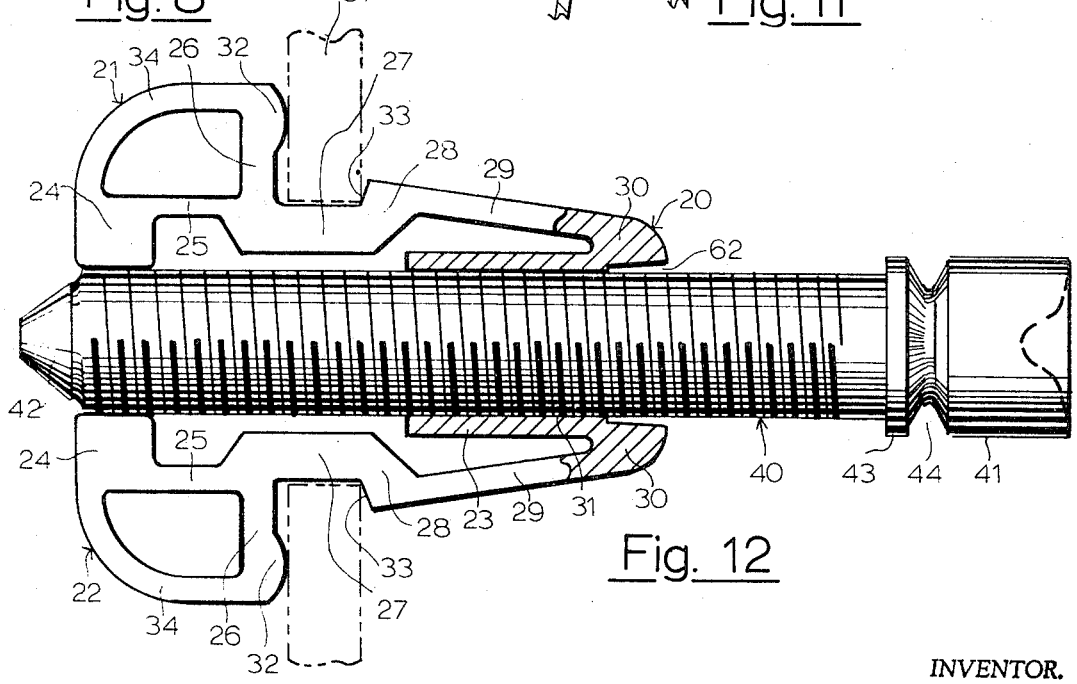
FIG. 12 is an enlarged side-elevational view of the coupling with a screw in spanning condition.

Referring now to the drawings in which like reference numerals refer to like and corresponding parts throughout the several views, the exemplary coupling 20 shown there to illustrate the invention, comprises paired opposed jaws 21 and 22 interconnected by a nut body 23, FIG. 12. Each jaw 21 and 22 has a pad 24 for engaging a screw at a point spaced from one face of a wall, a web 25 leading from the pad 24 toward a wall, a radial shoulder 26 on the web 25 for abutting one face of a wall, a neck 27 on the shoulder 26 for leading through a hole in a wall, a radial boss 28 on the neck 27 for abutting the other face of a wall, and a spring arm 29 leading from the boss 28 to an outer end 30 at a point spaced from the other face of a wall. The outer ends 30 of the spring arms 29 of both jaws 21 and 22 are connected to the nut body 23. The nut body 23 has a screw receiving aperture 31 of designed effort to permit turning the screw with a driver but which prevents the screw from turning otherwise.

More particularly, the shoulder 26 has an axially projecting bead 32 near its radially outer extremity for abutting the wall. The boss 28 has a sloping cam surface 33 for abutting the wall. The shoulder 26 and bead 32 oppose the boss 28 and cam surface 33 on each jaw 21 and 22. The jaws 21 and 22 angle outwardly from the nut body 23. A spring strip or bow 34 triangulates between the shoulder 26 adjacent its radially outer extremity and the pad 24 adjacent its axially outer extremity. A rocker flange 35 on the neck 27 projects radially inwardly. A screw 40 is threaded in the aperture 31 of the nut body 23. The screw 40 and coupling 20 are bridge-spanned on each other between the nut body 23 and the pads 24. The screw 40 may be so mounted prior to or after the coupling 20 is inserted in the hole 50 as herewith described.

Figure 5:
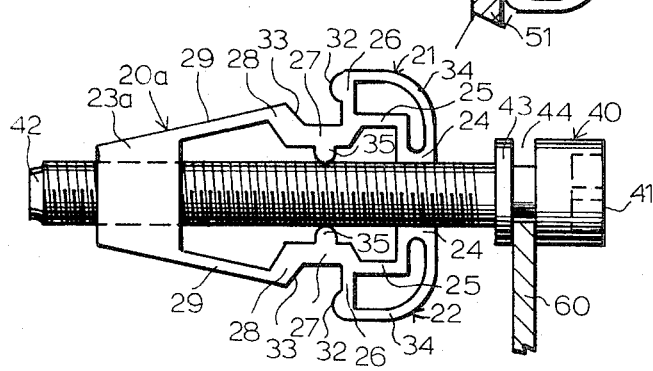
FIG. 5 is a view similar to FIG. 1 showing alternate structure and showing the screw head at the opposite end of the coupling.

A modified device 20a, FIG. 5, has a nut body 23a from which the spring arms 29 lead at a point adjacent the near end of the nut body 23a, rather than from the remote end as shown relative to the nut body 23 of the other figures.

Figure 6:
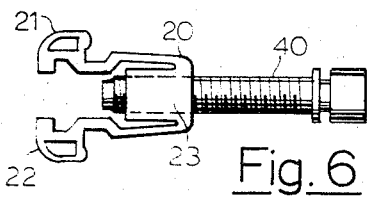
FIG. 6 is a side-elevational view of the coupling with a screw pre-assembled in the nut base.
Figure 7:
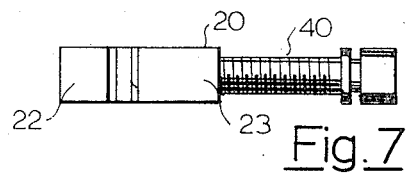
FIG. 7 is a top or bottom plan view of the coupling seen in FIG. 6 taken from the top or bottom as seen in FIG. 6.
Figure 9:
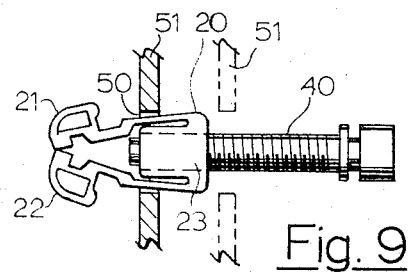
FIG. 9 is a side-elevational view of the coupling, similar to FIG. 6 showing the coupling and pre-attached screw partially inserted in the aperture of a part shown in cross-section with the spring arms being forced inwardly.
Figure 10:
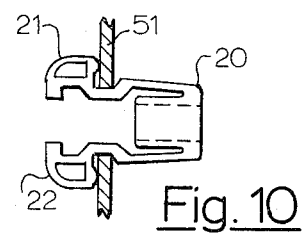
FIG. 10 is a side-elevational view of the coupling seen in FIGS. 6–8, shown is mounted condition in the aperture of a part shown in cross-section with the screw deleted.
Figure 8:
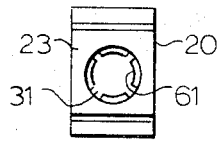
FIG. 8 is an end elevational view of the coupling seen in FIG. 6 with the screw deleted, showing the screw-engaging interrupted internal walls.
Figure 11:
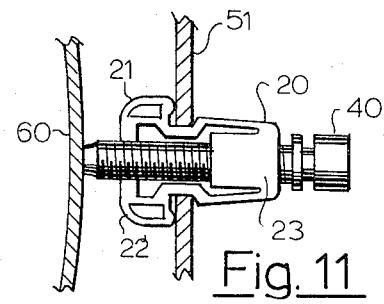
FIG. 11 is a side-elevational view of the coupling inserted in the hole of a part shown in cross-section with the screw advanced into spanning position in the coupling and with the end of th screw in use position against an element for adjusting its position.

Referring now to FIGS. 6 through 12, the embodiments of the invention shown therein show various ways of using the coupling 20. In FIGS. 6, 7, and 8, the screw 40 is threaded in the nut body 23 only and thus does not extend between the jaws 21 and 22. So assembled, the coupling 20 and the screw 40 are insertable in the hole 50 of the wall 51 as shown in FIG. 9. After the assembly is so positioned, the user turns the screw to the position seen in FIG. 11 and into engagement with a part 60 to be adjustably located and held by the screw 40. FIG. 8 shows interrupted internal walls 61 in the aperture 31 of the nut body 23 for engaging the threads of the screw 40 with designed effort. FIG. 10 shows the coupling 20 only mounted in the hole 50 of the wall 51 without the screw 40. When so used, the screw 40 is then threaded into the coupling 20 until it extends through the coupling 20. It should be noted that the screw 40 is insertable into the coupling 20, FIG. 10, from either side of the wall 51 and that the head 41 and the opposite end 42 of the screw can lie on either side of the wall 51 and at either end of the coupling 20. It should also be noted that the coupling 20 can be inserted from the other side of the wall as seen in FIG. 10 and the screw 40 screwed in the coupling 20 with its head 41 on either side of the wall 51 as desired. FIG. 12 shows modified coupling structure such as pads 24 of increased thickness, necks 27 of greater axial extent, and space 62 in the nut body 23 leading to the interrupted walls 61.

Figure 1:
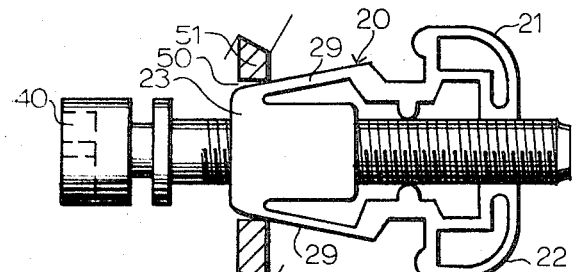
FIG. 1 is a side elevational view of the coupling with a screw therein.
Figure 2:
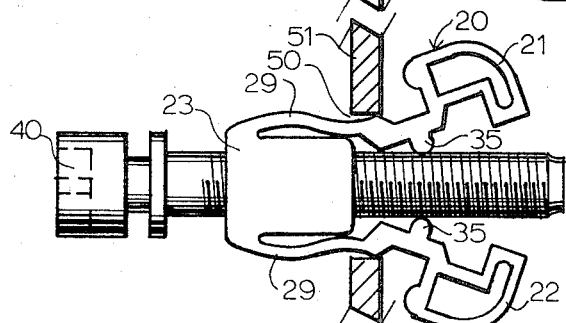
FIG. 2 is a view similar to FIG. 1 in conjunction with a wall and hole showing the first stage of insertion.
Figure 3:
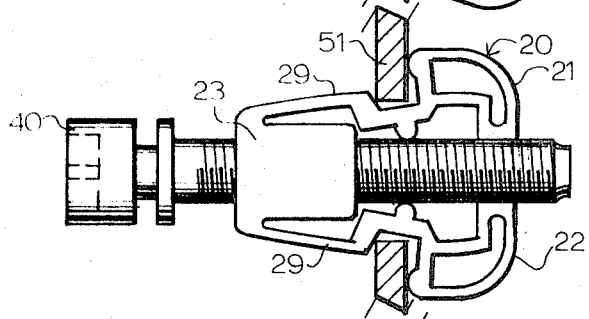
FIG. 3 is a view similar to FIG. 2 showing the second stage of insertion.
Figure 4:
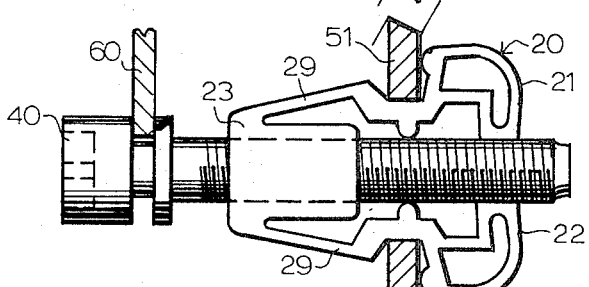
FIG. 4 is a view similar to FIGS. 2 and 3 showing the fully inserted and mounted condition and showing the screw head engaging a part for adjusting the position of the part.

The nut body 23 and spring arms 29 end of the coupling 20 is the portion first inserted in a hole 50 in a wall 51 with a screw 40 fully assembled, FIGS. 2, 3, and 4. Upon start of insertion, the nut body 23 and the ends 30 of the spring arms 29 enter the hole 50 and the outwardly angling spring arms 29 engage the edge of the wall 51, defining the hole 50. With further insertion, the spring arms 29 are cammed against the edge of the hole 50 and forced inwardly whereby the spring arms 29 become tortionally spring loaded during insertion. With further insertion the spring arms 29 move out of the hole 50 and move the bosses 28 radially outwardly into engagement with the far side or face of the wall 51. This latter occurs near or when the inserting movement engages the shoulder 26 with the near side or face of the wall 51. With a wall 51 of ideal designed thickness the shoulders 26 engage the near face just prior to the radially outer portions of the bosses 28 engaging the far face. Thus upon further inserting movement the shoulders 26 are flexed back axially upon the bosses 28 seating radially outwardly against the wall 51.

With a thicker wall 51, the shoulders 26 may be flexed more and the bosses 28 may be less fully seated. With a thinner wall, 51, the shoulders 26 are not flexed back so far and the bosses 28 may be fully seated to the neck 27. It will thus be understood that the wall thickness may vary above and below the designed thickness and the difference is compensated for between the opposing shoulder 26 and bosses 28 so that the jaws 21 and 22 fixedly engage the wall in spite of wall thickness variation within manufacturing tolerances. The screw 40 is bridge-spanned through the hole 50 in the wall 51 between the pads 24 on one side and the nut body 23 on the other side. Likewise the coupling 20 is bridge-spanned through the hole 50 in a wall 51 on the screw 40 at the pads 24 on one side and the nut body 23 on the other.

If the coupling 20 is inserted in the hole of a wall as described with the screw absent or turned only into the nut body 23, upon the screw 40 being advanced through the hole and encountering the pads 24, they are forced apart cocking against the spring strips 34, which in turn, force the shoulders 26 into increased forced engagement with the wall 51. The contact of the screw 40 with the pads 24 forcing them apart also urges the webs 25 and necks 27 radially outwardly to urge the cam surfaces 33 of the bosses 28 toward fully seated forced engagement with the wall 51. The screw 40 also engages the rocker flanges 35 and exert a radially outward force on the necks 27 which is transferred to both the shoulders 26 and bosses 28 to urge them against the wall 51 on opposite sides in opposition to one another.

If the coupling 20 is inserted in a hole in the wall with the screw 40 fully advanced and bridge spanning between the nut body 23 and past the pads 24, the inserting forces required are greater than those needed in the insertion of the coupling 20 just described because the screw 40 both lends support to the coupling 20 and limits flexing of the coupling 20. This is now described. As shown, the head 41 of the screw 40 is first inserted with the coupling 20 following until the spring arms 29 make contact with the edges of the hole 50. As the end 42 of the screw 40 extends past the pads 24, it provides means for exerting inserting force on the coupling 20. It will be noted that the screw 40 is only connected to the coupling at the nut body 23 and that this now lies on the far side of the wall 51. Thus force axially directed against the screw 40 at the end 42 by-passes the jaws 21 and 22 and is directly transferred to the nut body 23. Upon this force being impinged on the end 42 of the screw 40 by hand, by a hammer blow, and/or by an impact tool, the nut body 23 moves outwardly of the far side of the wall dragging the spring arms 29 past the edge of the hole whereby they are cammed radially inwardly and stretched axially, FIG. 2. The stretching force is transferred to the bosses 28 and the spring arms 29 flex at the bosses 28 straightening the angle therebetween making the bosses 28 easier to drag through the hole 50. When the bosses are by-passing the hole in their stretched and straightened condition, the shoulders 26 are cocked axially forwardly from the screw end 42 and their radially outer portions first make contact with the near face of the wall 51, FIG. 3. With continuation of inserting force and movement, the shoulders 26 are forced axially back toward the screw end 42 and this force is transferred from the shoulders 26 via the spring strips 34 to the pads 24 urging them against the screw 40. When the shoulders 26 are forced back sufficiently to clear the bosses on the far side of the wall 51 beyond the edge of the hole 50, the spring arms 29 tortionally urge the bosses 28 axially outwardly behind the far side of the wall. With termination of exerted inserting force, the axial stretch and straightening action between the spring arms 29 and the bosses 28 is also ended and the bosses 28 resume their normal angular relationship to the spring arms 29 and cock back up fully behind the far side of the wall 51 to secure the coupling 20 in the hole 50 in the wall 51, FIG. 4.

During the first portion of the forced inserting movement with a coupling equipped with rocker flanges 35, FIG. 2, the spring arms 29 and bosses 28 are provided with a straightening reaction point close to the flexure point between the spring arms 29 at the bosses 28. The rocker flanges 35 provide a close pivot point against the screw 49 effecting increased flexure of the spring arms 29 and thus increase straightening action between the spring arms 29 and the bosses 28. This decreases the resistance of the bosses 28 to entering and by-passing the edges of the hole. It also causes the necks 27 to cock radially outward at their ends on the near side of the hole 50. However once the bosses 28 are inside the hole their resistance to further insertion is at minimum and the major portion of the inserting force is now directed against the shoulders 26 when they contact the near side of the wall at their radially outer ends, FIG. 3. Upon the inserting force flexing the shoulders 26 back toward the end 42 of the screw 40 and moving the bosses 28 out of the hole, the shoulders 26 exert correcting force on the necks 27 causing them to rock back reversely on the rocker flanges 35 which in turn exert a correcting force on the bosses 28 urging them to rise behind the far side of the wall 51 and an unbending correcting force is then exerted by the bosses 28 relative to the spring arms 29 urging the spring arms 29 to their normal angular position to the bosses 28, FIG. 4.

The head 41 of the screw 40 may lie at either end of the coupling 20 whether the coupling 20 alone is first inserted in the hole 50 and the screw 40 then turned in or with the coupling 20 and screw 40 assembled and inserted together as the inserting force may be impinged on the screw head 42 as well as the screw end 41. This enables the user to mount the coupling in the hole in the wall from the most advantageous side or as desired and the screw head 41 or end 42 may be on either side as desired. This facilitates open and blind mounting of the screw 40 with equal ease and full facility. Also the part controlled by the screw may be in contact with the head 41 or the end 42 of the screw 40 as desired. The collar 43 forms a channel 44 with the head 41 on the screw 40. A tongue, washer, or edge of a part controlled may lie in the channel 44 and be controlled such as the flange of a head lamp socket of an automobile, an electrical contact or arm, or a limit stop, etc., all of which may require adjustment. The head 41 or end 42 may also directly control the position of a part.

In the preferred embodiment of the coupling 20, it is injection molded of stiff but resilient synthetic resin material so that it is non-rusting and of one-piece construction. However other materials, methods of manufacture, and type of construction may be employed. While the coupling is shown as rectangular in cross-section, it may be shaped otherwise such as square, round, oval or poly-gonal. The angular shape when inserted in an angular hole prevents relative rotation between the coupling 20 and the wall 51 and solid reaction to the torque exerted in turning the screw 40 relative to the coupling 20. It will thus be understood that any angular abutment between the coupling 20 and the wall will serve this purpose.

It will be noted that the coupling 20 is firmly anchored on the wall against axial, radial, and angular movement or any combination thereof. It will be noted that the coupling 20 supports the screw 40 at wide-spaced axial points outwardly of the wall 51 insuring that the screw 40 is held securely against axial, radial, and angular movement relative to a part held in adjusted position. It will also be noted that manually turning the screw 40 to make adjustment to any adjusted position is devoid of compressive forces exerted by the screw threads as cam ramps so that there is no residual creeping before or after adjustment, but rather that the assembly is immediately and accurately responsive and retentive.

The fact that the coupling 20 and the screw 40 may be mounted fully assembled in a hole 50 allows the desired gaged extention of the screw 40 to be pre-set or calibrated so that this may be done in mass quantities and all the workman has to do is put the assembly in a hole and hit it with a hammer and the mounting is completed, usually without any necessity to adjust the screw extension and, in cases where some adjustment is required, it usually is minor and quickly accomplished.

While the coupling 20 has been described as a desirable mounting for an adjusting screw because it demonstrates its utility fully, it will be understood that the coupling 20 may secure a screw for permanently mounting things as well.

I claim:

1. A coupling for mounting on an apertured support member comprising,
    a nut body having a bore therethrough to receive a screw adapted to be disposed outwardly of one side of a support member,
    paired, spaced and opposed vise-like heads axially spaced from said nut body adapted to be disposed outwardly of the other side of a support member; said heads including internal surfaces spaced apart a distance to allow for spring torsion bending toward one another so as to locate said heads generally corresponding to the diameter of said bore when mounted;
    paired spaced and opposed support member aperture engaging middle necks lying intermediate of and spaced from both said nut body and said vise-like heads; said necks having opposite ends,
    paired spaced and opposed spring arms inclined outwardly from said nut body and extending toward said heads;
    paired outwardly extending support member engaging bosses extending generally radially outwardly on said ends of said necks and joining said spring arms;
    paired spaced and opposed and generally axially extending spring struts connected between said vise-like heads and said other ends of said necks, and
    paired outwardly extending support member engaging shoulders on said other ends of said necks at said spring struts; said shoulders being axially opposed to said bosses;
    the distance between said opposed necks, spring arms, and spring struts being substantially greater than the diameter of said bore;
    said necks, bosses, and shoulders being urged into support member gripping relationship by said spring arms with said nut body and said vise-like heads cantilevered outwardly on opposite sides of the support member;
    said spring struts urging said vise-like heads toward each other;
    said nut body and said vise-like heads being adapted to engage a screw adjacent its ends to bridge-span the screw through the aperture of the support member in spaced relationship to said spring arms, necks, and spring struts.

2. In a coupling as set forth in claim 1, a screw in said coupling; said coupling together with said screw being insertable in the aperture of a support member by the flexing of said spring arms and spring struts and the space between said necks and said screw allowing said bosses to move toward said screw to pass through the aperture.

3. In a coupling as set forth in claim (1,) 1, a cam surface on each said radial boss sloping radially inwardly to said neck and sloping axial toward said shoulder so as to diminish the wall receiving space between said boss and said shoulder radially inwardly to said neck (on each said jaw);
    said cam surfaces (on said jaws) in conjunction with radially outward movement (of said jaws) in gripping a wall engaging a face of a wall at the hole with inclined plane action and force to jam said bosses and said shoulders against opposite faces of a wall;
    said cam surfaces also providing for so engaging walls at various points along said cam surfaces to compensate for various thickness in walls.

4. In a coupling as set forth in claim (1,) 1, each said shoulder having a radially outer extremity; an axially projecting bead on said shoulder adjacent its radially outer extremity extending toward said boss diminishing the wall receiving space between said boss and said shoulder (on each said jaw);
    said beads engaging a wall in opposition to said bosses by reacting against said shoulders with said shoulders elastically compensating for various thickness in walls by resiliently supporting said beads.

5. In a device as set forth in claim (1,) 1, each said shoulder having a radially outer extremity; each said (pad) head having an axial outer extremity; a spring strip triangulating between said shoulder and said (pad) head at a point adjacent their outer extremities (on each said jaw);
    said spring strips as based on said shoulder urging said (pads) heads against a screw;
    said spring strips as based on said (pads) heads urging said shoulders against a wall;
    said spring strips being so integrated as to exert resilient force against both said shoulders and said (pads) heads.

6. In a device as set forth in claim (1,) 1, a rocker flange on said neck extending radially inwardly therefrom (on each said jaw); said rocker flanges providing proximate pivot points (on each said jaw) to effect maximum flexing of said spring arms at said bosses to straighten said bosses relative to said spring arms to reduce their outward radial projection to facilitate their entry into and passage through a hole in a wall(;).

7. A coupling for mounting a screw in a hole in a wall, comprising;
    paired opposed jaws each having:
        a pad for engaging a screw at a point spaced from one face of a wall;
        a web leading from said pad toward a wall,
        a radial shoulder on said web for abutting one face of a wall,
        a neck on said shoulder for leading through a hole in a wall,
        a radial boss on said neck for abutting the other face of a wall, and
        a spring arm leading from said boss and terminating in an outer end at a point spaced from the other face of a wall;

a nut body connected to said outer end of said spring arm of both said jaws;

said nut body having a screw receiving aperture;

said webs and said shoulders spacing said pads axially outwardly of one face of a wall when mounted;

said spring arms and said bosses spacing said nut body axially outwardly of the other face of a wall when mounted;

said spring arms when said coupling is not mounted angling outwardly from said nut body to space said jaws apart so that they are forced inwardly when mounted to torsionally-load said spring arms to urge said jaws radially outwardly into gripping relationship with the wall faces;

a screw being bridge-spanned through a hole in a wall at points spaced from a wall between said nut body and said pads and said coupling being bridge-spanned through a hole in a wall on a screw at points spaced from a wall between said nut body and said pads;

said pads when in engagement with a screw rocking back said web to forceably push said shoulders against the one face of a wall and to forceably pull said bosses via said necks against the other face of a wall to urge said jaws to grip a wall;

a cam surface on said radial boss sloping radially inwardly to said neck and sloping axially toward said shoulder so as to diminish the wall receiving space between said boss and said shoulder radially inwardly to said neck on each said jaw;

said cam surfaces on said jaws in conjunction with radially outward movement of said jaws in gripping a wall engaging a face of a wall at the hole with inclined plane action and force to jam the said bosses and said shoulders against opposite faces of a wall;

said cam surfaces also providing for so engaging walls at various points along said cam surfaces to compensate for various thickness in walls;

said shoulder having a radially outer extremity; an axially projecting head on said shoulder adjacent its radially outer extremity extending toward said boss diminishing the wall receiving space between said boss and said shoulder on each said jaw;

said beads engaging a wall in opposition to said bosses by reacting against said shoulders with said shoulders elastically compensating for various thickness in walls by resiliently supporting said beads;

said pad having an axial outer extremity, a spring strip triangulating between said shoulder and said pad at a point adjacent their outer extremities on each said jaw;

said spring strips as based on said shoulders urging said pads against a screw; said spring strips as based on said pads urging said shoulders against a wall; said spring strips being so integrated as to exert resilient force against both said shoulders and said pads; and a rocker flange on said neck extending radially inwardly therefrom on each said jaw; said rocker flanges providing proximate pivot points on each said jaw to effect maximum flexing of said spring arms at said bosses to straighten said bosses relative to said spring arms to reduce their outward radial projection to facilitate their entry into and passage through a hole in a wall;

said jaws being separate from one another with said jaws cantelevering at their said spring arms from said nut body;

said webs of each said jaw lying radially inwardly of and spaced from said spring strips of each said jaw.

* * * * *